United States Patent [19]
Barlow et al.

[11] Patent Number: 4,724,519
[45] Date of Patent: Feb. 9, 1988

[54] CHANNEL NUMBER PRIORITY ASSIGNMENT APPARATUS

[75] Inventors: George J. Barlow, Tewksbury, Mass.; James W. Keeley, Hudson, N.H.; Elmer W. Carroll, Billerica, Mass.

[73] Assignee: Honeywell Information Systems Inc., Waltham, Mass.

[21] Appl. No.: 750,117

[22] Filed: Jun. 28, 1985

[51] Int. Cl.⁴ .............................................. G06F 13/36
[52] U.S. Cl. .................................................... 364/200
[58] Field of Search ... 364/200 MS File, 900 MS File; 370/85; 340/825.5, 825.51

[56] References Cited

U.S. PATENT DOCUMENTS

| | | | |
|---|---|---|---|
| 3,832,692 | 8/1974 | Henzel et al. | 364/200 |
| 4,030,075 | 6/1977 | Barlow | 364/200 |
| 4,096,569 | 6/1978 | Barlow | 364/200 |
| 4,385,350 | 5/1983 | Hansen et al. | 364/200 |
| 4,559,595 | 12/1985 | Boudreau et al. | 364/200 |

OTHER PUBLICATIONS

Jendro, Jim, "Extending the Megabus", Mini-Micro Systems, Sep. 1983, pp. 235-240.

Primary Examiner—Thomas M. Heckler
Attorney, Agent, or Firm—Faith F. Driscoll; John S. Solakian

[57] ABSTRACT

A data processing system has a system bus network which includes a distributed priority network for transferring data asynchronously between a number of subsystems which couple to the bus. Each subsystem includes priority logic circuits coupled to receive a group of priority signals from the priority network which establish when the subsystem has the highest priority of the requesting subsystems to access the bus. The number of subsystems include a plurality of identical subsystems, each of which has a channel number assignment apparatus. The apparatus of each identical subsystem is connected to receive the same of at least one of the group of priority signals. During the idle state of the system bus, the apparatus of each identical subsystem operates to store a unique state of the priority signal which is defined as a function of the subsystem's position on the bus thereby automatically establishing a unique channel number value for each identical subsystem.

23 Claims, 4 Drawing Figures

CHANNEL NUMBER PRIORITY ASSIGNMENT APPARATUS

BACKGROUND OF THE INVENTION

1. Field of Use

This invention pertains to data processing systems and, more particularly, to identification apparatus for transmitting and receiving requests over a common bus.

1. Prior Art

There are a variety of methods and apparatuses for interconnecting the different unit controllers of a data processing system for transmitting and receiving requests over a common bus. The transfer of requests proceeds either over synchronous or asynchronous generated bus transfer cycles of operation.

U.S. Pat. Nos. 4,030,075 and 4,096,569, assigned to the same assignee as named herein, are illustrative of an asynchronous bus system. These systems have units which are coupled in a priority network which is distributed along the system bus.

There are three basic parts to overall sequence of cycles used in communicating along the asynchronous bus network. There is a priority determining part during which the priority network establishes the priority of units wishing to communicate on the bus relative to granting bus cycles. This is followed by a data coming now part during which the highest priority unit is granted access to the bus and is allowed to transfer data, address and command information to the bus. The last part of the sequence is the response part in which a slave unit transmits a response to the requesting device (master unit) indicating its completion of a requested operation.

Read requests include a channel number portion identifying the requestor (i.e., master unit) to permit the response to be directed back to the originator of the request. The master unit compares the channel number portion of each request sent by it to the slave unit during a previous bus cycle with the channel number received back from the slave unit during a subsequent cycle of operation.

Thus, with the exception of memory units identified by memory addresses, each of the units of the system is required to be uniquely identified by a channel number. That is, a unique channel number is assigned to each unit with full and half duplex units being assigned two channel numbers. In such systems, the channel number is set by rotary or thumb wheel switches within the unit. In certain cases, jumpers are included within the unit which are cut to specify the desired channel number.

It has been found that whenever jumpers or switches are required, this raises the factory cost of the unit because of the additional cost for testing the unit's ability to recognize different channel numbers. Also, the reliability of the unit decreases due to the likeliness of incorrect channel number settings. Further, additional documentation is required for instructing how to make channel number assignments.

To overcome the above problems, efforts have been made to assign channel numbers by other than switches or jumpers. Here, it has been observed that when there are no jumpers to define the channel number, the unit will assume some binary number upon being powered up. This introduces into the system the probability that two units could have the same channel number when powered up. Accordingly, when attempts are made to allocate one of these units a specific channel number, both units will assume that channel number. Thus, notwithstanding the type of mechanism used to communicate with the units, the result is that several units have the potential of starting with an incorrect channel number at power-up and being switched to an incorrect channel number value.

Another solution which has been considered is to prewire the channel number of each unit into the back plane of the system bus. The disadvantage is that a considerable number of pins must be allocated for assigning such channel numbers. Also, this can produce other problems where certain units are assigned specific values of channel numbers. For example, processing units in the referenced patents are assigned the first ten channel numbers. When the channel numbers are hard-wired into the system, the first ten slots could only be used by processing unit boards and these slots would have to be reserved for such units. Since a system generally has only two processing units, a large number of the slots would remain unused.

In addition to the above, where the channel number is required to be provided by means external to the board, such means cannot be tested by the board itself. Therefore, factory cost is again increased because the board would have to be tried in different slots within the system to verify its allocation of all possible channel number values. The above problems are further complicated where the system has a number of identical units/boards or moreover where the identical units are central processing units.

Accordingly, it is a primary object of the present invention to provide apparatus for reliably ensuring that identical units on a system are assigned unique channel numbers.

It is still a further object of the present invention to provide channel number assignment apparatus which permits the allocation of unique channel numbers to units automatically with a minimum of circuits.

SUMMARY OF THE INVENTION

The above objects of the present invention are achieved by the illustrative embodiment which includes a plurality of units including a number of identical units which are coupled to communicate requests including data, command and address signals between units over a bus system on a priority basis defined by a distributed or skewed priority network. In the preferred embodiment, the skewed priority network is arranged as shown in the systems disclosed in U.S. Pat. No. 4,096,569 and in the article titled "Extending the Megabus" by Jim Jendro, published in the September, 1983 issue of the publication MINI-MICRO SYSTEMS.

Each identical unit has a common interface portion which includes channel number priority assignment apparatus for assigning the unit a unique channel number for reliable communication with other units. Each common interface further includes tiebreaking network circuits which are connected to receive the physically skewed signals from the priority network and establish when the unit is to be granted access to the system bus.

In the preferred embodiment of the present invention, the channel number priority assignment apparatus of each identical or like unit or subsystem receives at least a predetermined one of the physically skewed priority signals which uniquely identifies its position on the system bus. The assignment apparatus includes channel storage means which in response to an initialize signal from the system bus stores a channel number value corresponding to the state of the predetermined priority signal identifying to the unit which subsystem it is.

In the preferred embodiment, the identical or like units or subsystems include a pair of central processing units. The unique single bit signal derived from the priority network signals and stored in the channel storage of each central processing unit subsystem is combined with a fixed value. The resulting value is used to define a multibit channel number identifying the subsystem which is transmitted as part of each read request.

Only one of the identical subsystems which is allocated the highest priority is required to be located in one of the normally assigned group of sequential slots. The remaining identical subsystem can be located in any slot outside the group of slots. Because identical subsystem boards do not have to be assigned sequential bus slots, this gives added flexibility to the assignment of bus slots to different board types.

When a system has a limited number of units, there is no need to combine the bus derived channel number value with a fixed preassigned code. It is only necessary to interpret the priority network signals at a particular slot/position on the bus. This can be done by means of an encoder or equivalent logic circuits. The multibit output of the encoder is then stored in multibit channel storage register and used directly by the unit as part of each bus request.

Accordingly, the invention can be used in a variety of system configurations containing mixtures of identical units. Moreover, the introduction of the apparatus of the present invention does not require any changes in the operation and in the circuitry of the associated bus interface circuits. Further, a minimum of circuits can be used in each identical unit for reliably defining unique channel numbers. System complexity and cost are reduced, since the need for switches, jumpers and associated documentation has been eliminated.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

DESCRIPTION OF SYSTEM OF FIG. 1

Figure 1:
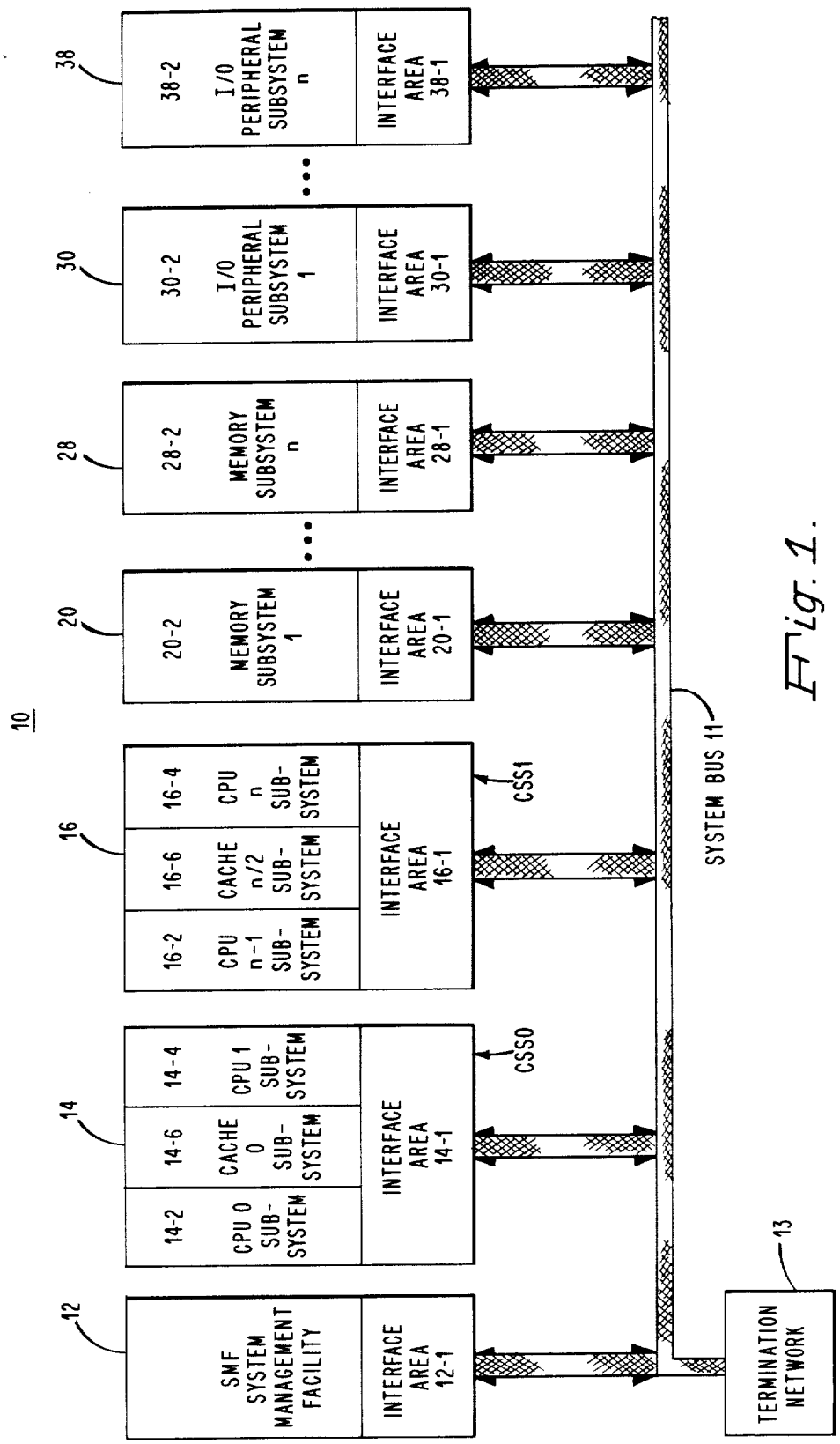
FIG. 1 is a block diagram of a system which includes the apparatus of the present invention.

FIG. 1 shows a data processing system 10 which includes a plurality of identical central subsystems 14 and 16, a system management facility 12 and a number of different subsystems 20 through 38 coupled in common to a system bus 11. The illustrative different subsystems include a number of memory subsystems 20 through 28 and a number of peripheral subsystems 30 through 38. Each subsystem includes an interface area which enables the unit or units associated therewith to transmit or receive requests in the form of commands, interrupts, data or responses/status to another unit on system bus 11 in an asynchronous manner.

The system 10 further includes a termination network 13 located at the left end of bus 11. The network 13 defines the high priority end of bus 11. The System Management Facility (SMF) 12 which is positioned next to network 13 has the highest priority. As in the referenced prior art bus systems, bus priority decreases as a function of each unit's distance from network 13. Typically, in such prior art bus systems, the memory is given the highest priority and the central processing unit is given the lowest priority since it has the lowest real time constraints in contrast with the other units positioned on the bus as a function of their performance requirements. However, since the CPU is the heaviest user of the bus, it is desirable that it be positioned as close to memory as possible. Accordingly, the interface circuits have been modified to allow the lowest priority central subsystems 14 and 16 to be physically positioned on the bus 11 next to memory subsystem 20-2 as shown. Since the particular type of bus priority circuit is not pertinent to an understanding of the present invention, such circuits will be considered identical, and from the point of use the bus can be viewed logically as if the central subsystems 14 and 16 were connected to the other end of the bus 11. For further information regarding the type of priority logic circuit which can be used, reference may be made to the copending patent application of Daniel A. Boudreau, et al, titled "Distributed Priority Network Logic for Allowing a Low Priority Unit to Reside in a High Priority Position", Ser. No. 06/453,406, Filed Dec. 27, 1982 now U.S. Pat. No. 4,559,595 and assigned to the same assignee as named herein. Therefore, memory subsystems 20-2 through 28-2 have the highest priority followed by peripheral subsystems 30-2 through 38-2. For the purpose of the present invention, the details of SMF subsystem 12 are not pertinent to an understanding of the present invention. The remaining subsystems can also be considered conventional in design.

Figure 2:
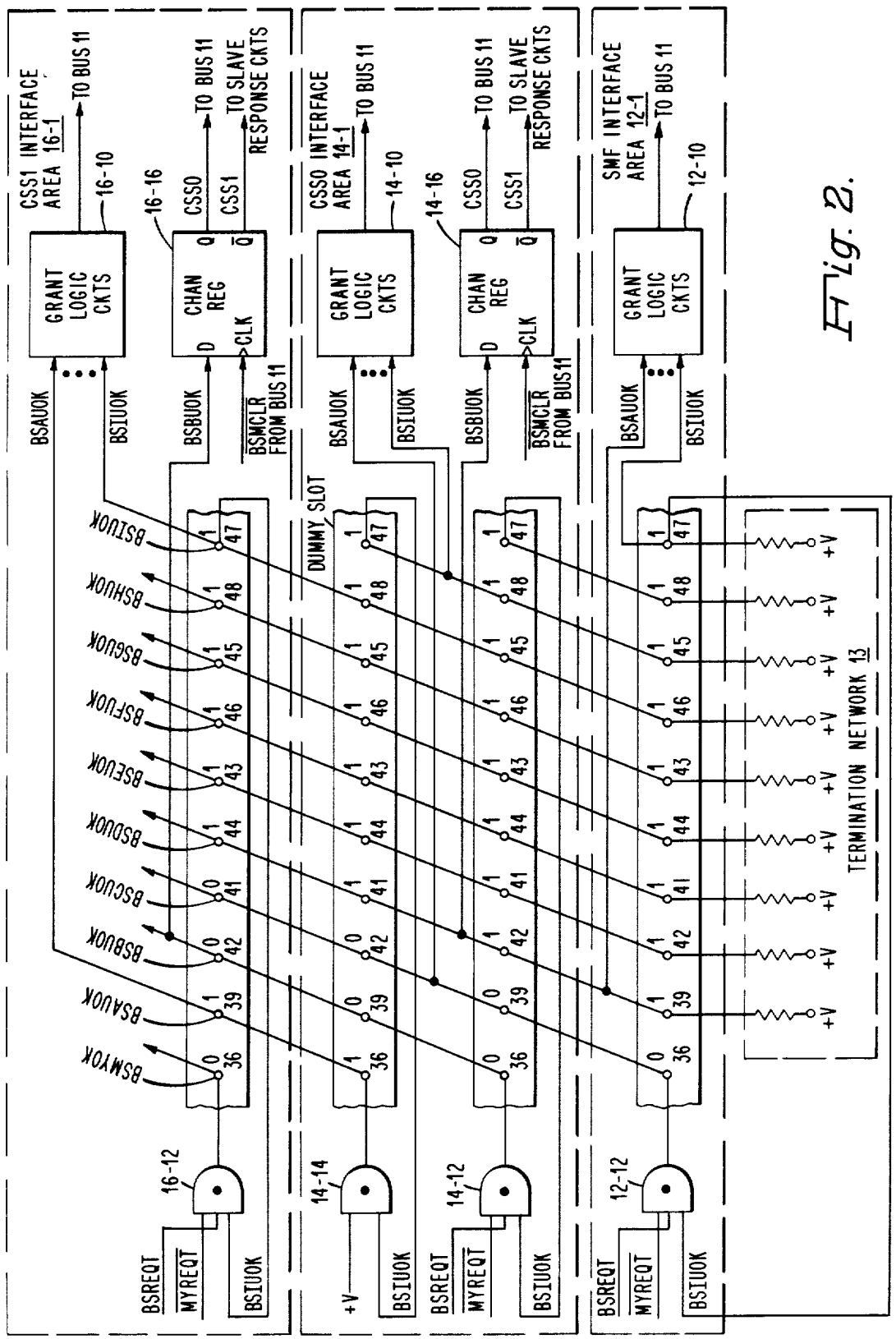
FIG. 2 shows in greater detail, the skewed priority network of the system bus and the subsystem interface areas of identical central subsystems 14 and 16 of FIG. 1.

FIG. 2 shows in greater detail a section of system bus 11 and interface areas 14-1 and 16-1 of central subsystems 14 and 16. The diagonal lines in the Figure correspond to etch lines or copper printed circuit board traces of a backplane. For simplicity, only four bus slots are shown, each being represented by a connector, only a portion of which is shown. The physically skewed or diagonal lines correspond to the ten priority signals used by each unit connected to system bus 11. Each of the remaining pins of each connector are connected together to the same pins.

Bus slots are arranged in groups of ten for priority resolution. Thus, as shown, the priority resolution circuits (e.g. grant logic circuits 12-10 through 16-10) of each interface area of each subsystem board receive nine priority input signals BSAUOK through BSIUOK from the previous nine higher priority boards via pins 39 through 47 of its connector. Each interface area of each subsystem board takes the ninth priority signal BSIUOK and logically combines it with permission signals $\overline{\text{MYREQT}}$ and BSREQT within an AND gate (e.g. gates 12-12, 14-12 and 16-12). The output BSMYOK of the AND gate is applied to the tenth pin (i.e., pin 36) of the connector so that every ninth slot repeats the previous nine slots signal (i.e., the oldest priority signal it receives, BSIUOK). The signal BSMYOK when forced to a binary ONE signals that the associated subsystem is granting permission to use the bus 11 to every other subsystem of lower priority. Bus priority is established as a function of the subsystem's position on the bus 11. At the beginning of bus 11, there is a row of pull-up resistors corresponding to network 13. The highest priority subsystem (i.e., SMF12) has its nine input pins connected to these resistors. Thus, all of the priority signals applied to its priority resolution circuits 12-10 are in a binary ONE or on state. Hence, anytime subsystem 12 wants access to bus 11, it will be granted.

Proceeding to the priority bus structure, it is seen that subsystem 14 designated as the first central subsystem (i.e., CSS0) receives signals defining the next highest priority slot. All of the priority input pins except pin 36 connect to pull-up resistors. Thus, CSS0 receives only one real active priority signal BSAUOK as an input. This signal is derived from signal BSMYOK which is generated by the SMF subsystem.

In the illustrated embodiment, CSS0 occupies two bus slots which requires an additional AND gate 14-14 for granting permission. The same is true of a second central subsystem CSS1. As shown, CSS1 is positioned to receive signals defining the next highest priority slot on the bus 11. That is, it receives three active priority signals BSAUOK, BSBUOK and BSCUOK. The remaining input pins connect to pull-up resistors. However, since priority signal BSAUOK is generated by a dummy slot, it is effectively connected to a pull-up resistor.

Since subsystems CSS0 and CSS1 are identical, it is essential that they have unique channel numbers. The apparatus of the present invention permits each subsystem to identify for itself which unique channel number it has been allocated. It does this by examining its position on bus 11 using the available priority network signals. That is, since there are only two identical subsystems, a single bit used as the lowest low order channel number bit is all that is required for uniquely specifying both subsystems.

As seen in FIG. 2, subsystems CSS0 and CSS1 each include a channel register (e.g. 14-16 and 16-16) which is connected to receive skewed priority signal BSBUOK applied to pin 42. As explained herein, when the bus 11 is in an idle state, the signal BSBUOK, applied to subsystem CSS0, is a binary ONE while for subsystem CSS1, it is a binary ZERO. It is seen that in each case, signal BSBUOK connects to a data input terminal of the channel register flip-flop (i.e., 14-16 and 16-16). The clock input terminal of each flip-flop is connected to receive the negation of a bus master clear signal BSMCLR from bus 11. The state of this signal defines the idle state of bus 11.

As seen from FIG. 2, each of the channel register flip-flop 14-16 and 16-16 operate to generate low order channel number signals CSS0 and CSS1, defining which subsystem they are. These signals are applied as inputs to slave response logic circuits included within the respective interface areas 14-1 and 16-1. Additionally, these signals are applied to bus 11 as part of the identification information included in each request generated by the subsystem. In greater detail, each of the signals CSS0 and CSS1 is combined with a high order preassigned code which corresponds to an all ZEROS code.

Figure 3:
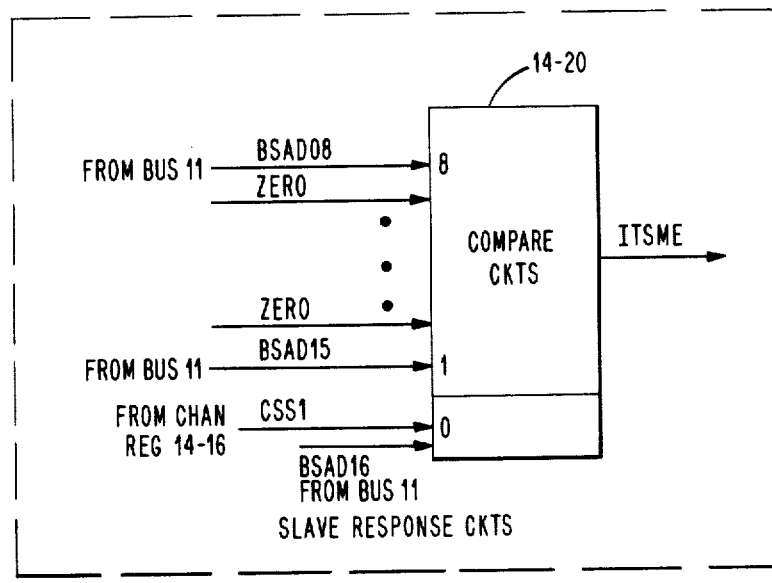
FIG. 3 shows in greater detail other circuits included within the subsystem interface areas of FIG. 2.

FIG. 3 shows a portion of the slave response circuits 14-20 of subsystem CSS0 which receive the low order channel number output value stored in channel register 14-16.

The circuits 14-20 include a number of gates which compare the channel number received from bus 11 with the channel number of subsystem CSS0. Since central subsystems are allocated the first ten channel numbers, the upper channel number bits have an all ZERO value. When a comparison is detected, circuits 14-20 generate signal ITSME. Circuits identical to circuits 14-20 are included in subsystem CSS1.

Figure 4:
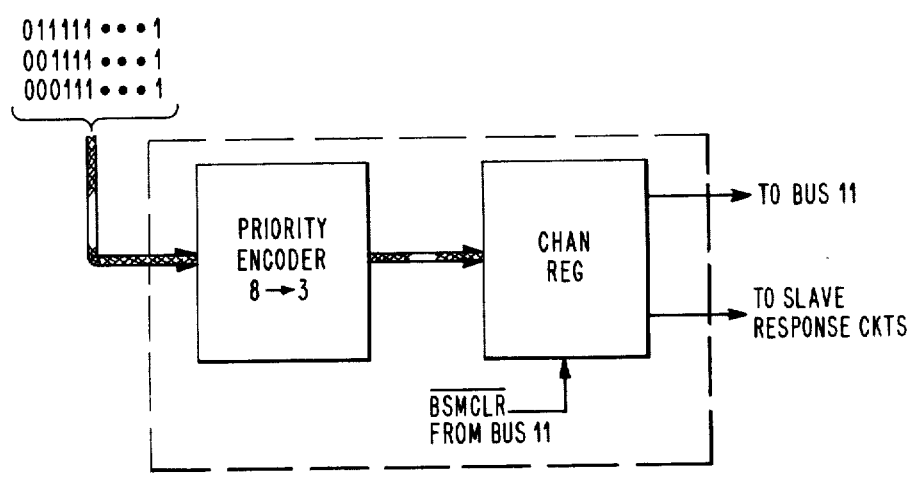
FIG. 4 shows an alternate arrangement for assigning channel number values according to the teachings of the present invention.

FIG. 4 shows another arrangement for providing channel numbers. This arrangement can be used where a small number of subsystems are attached to bus 11. In certain cases, there may not be the need to combine the stored priority derived channel number bit values with a fixed value. As seen from FIG. 4, the skewed priority signals from the backplane are applied to a priority encoder circuit as, for example, an octal to binary encoder. The encoder circuit of FIG. 4 can be constructed from conventional integrated circuits such as those designated as SN74148 manufactured by Texas Instruments Inc.

The encoder circuit translates the first eight bits which it receives (i.e., one of the patterns shown) into a three-bit code which is stored in a multibit channel register. The three-bit channel number code is then applied to same circuits as discussed above. So long as there is a discernable pattern of ZEROS present, the translation can take place in the desired manner. Thus, even if there are binary ONES present, such as in the pattern produced by the circuits of FIG. 2, encoding can still be accomplished as desired.

DESCRIPTION OF OPERATION

With reference to FIGS. 1-3, the operation of the apparatus of the present invention will now be described. When system 10 of FIG. 1 is powered up, bus master clear signal BSMCLR is forced to a binary ONE or on state. This causes the circuits within each subsystem to be initialized to a known state such as being cleared to a ZERO state. Accordingly, at the end of the master clear interval, defined by the trailing edge of the bus master clear signal BSMCLR, the Bus 11 is returned to an idle state. This is signalled by the clearing of all of the priority network signals to a guaranteed ZERO state. Thus, at the end of the master clear signal, the signals provided by the pull-up resistors of network 13 are guaranteed to be binary ONES while the actual priority signals are guaranteed to be binary ZEROS.

Utilizing this fact, the trailing edge of the negation of the bus master clear signal BSMCLR is used to load the channel number register flip-flops 14-16 and 16-16 of subsystems CSS0 and CSS1, respectively with the different states of bus priority signal BSBUOK during the idle state of bus 11. The result is that channel number flip-flop 14-16 switches a binary ONE while channel number flip-flop 16-16 switches to a binary ZERO.

As discussed above, the single bit channel number values are used as the low order bit of the subsystem channel number to communicate over bus 11. Briefly, the operation of bus 11 is asynchronous, with the timing of each cycle being controlled solely by the subsystems exchanging information. The subsystem initiating a bus cycle is called the master and the responding subsystem is called the slave. There are three basic parts or operations involved in using bus 11. These are a priority resolution determination part, a data coming now part and a response part. During the first part, the priority logic circuits within the subsystem desiring acess to bus 11 establishes when it can have access. For example, when central subsystem CSS0 wants to request data from memory, it makes a bus request. When the circuits 14-10 establish that subsystem CSS0 has the highest priority of the requesting subsystems to access the bus, the circuits generate a data coming now signal which defines the start of the bus cycle. This signal turns on a grant flip-flop, and subsystem CSS0 is allowed to send the memory request including the command and address on the bus 11. Along with the address applied to bus 11 is included the channel number for subsystem CSS0 whose low order bit value corresponds to signal CSS0. The slave responds by means of an ACK, NAK or WAIT signal to acknowledge receipt of the request and terminate the bus cycle. The bus 11 returns to an idle state or the priority network circuits select another subsystem to access the bus.

When the slave has fetched the requested data, it requests a bus cycle. Upon being granted access, the slave applies the channel number of subsystem CSS0. The slave response circuits 14-20 of FIG. 3, upon verifying an identical comparison between the received channel number and subsystem CSS0's stored channel number, generates signal ITSME. This enables subsystem CSS0 to receive the slave data from bus 11.

From the above, it is seen how the apparatus of the present invention makes it possible to reliably and automatically assign unique channel numbers to identical substems. Since the system of FIG. 1 has only two identical central subsystems CSS0 and CSS1, only a single bit is required to distinguish between the two. The automatic assignment is made by selecting a predetermined priority network signal from bus 11 to be applied to the channel storage register of each subsystem. The difference in the positional priority between subsystem CSS0 and CSS1 permits the reliable assignment of unique channel number values.

To expand the assignment beyond a single bit, a number of priority network signals can be encoded and the result stored as shown in FIG. 4. It will be obvious to those skilled in the art that many changes can be made to the preferred embodiment of the present invention. For example, changes may be made in the positional priority network (e.g. increase or decrease the number of slots/positions of the group of slots in FIG. 2). Also, the number of identical subsystems may be increased. The positioning of the identical subsystems may be changed. Also, the identical subsystems can be any type of subsystem.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A data processing system including a plurality of units having a number of like units, each of said plurality of units being coupled to different physical points on a common bus for transferring requests between said units on a priority basis as defined by a distributed bus priority network on the basis of a unit's physical position on said bus relative to one end of said bus, each of said plurality of units including circuits for receiving a plurality of skewed priority signals from said priority network defining said physical position connection of said each unit to said bus, each of said number of like units further including:

First input means connected to said bus for receiving at least a predetermined one of said skewed priority signals from said bus priority network;

second input means connected to said bus for receiving a signal from said bus indicating an interval of time when said bus priority network is in an idle condition as defined by said plurality of skewed priority signals; and, storage means connected to said first and second input means, said storage means being conditioned by said second input means to store an indication of the state of said predetermined one of said priority signals applied by said first input means during said idle condition, said state of said predetermined one of said skewed priority signals stored by said storage means being used to uniquely define the identity of said unit in transferring requests to said common bus.

2. The system of claim 1 wherein said number of like units is two and said storage means of each like unit is connected to receive the same predetermined one of said priority signals from said network at its corresponding physical position.

3. The system of claim 2 wherein said storage means includes a bistable element having a date input terminal and a clock input terminal, said data input terminal being connected to receive said same predetermined one of said priority signals and said clock input terminal being connected to receive said signal from said bus indicating said idle condition, said bistable element of one of said like units physically positioned on said bus to have a higher priority being switched to a first state and said bistable element of the other one of said like units being switched to a second state.

4. The system of claim 3 wherein said first and second states are defined by the binary ONE and binary ZERO states respectively of said bistable element.

5. The system of claim 3 wherein said signal indicating said idle condition operates to clear each of said units to an initial state resulting in said idle condition.

6. The system of claim 1 further including means connected to said storage means for combining said signals identifying said unit with a fixed preassigned code to produce a resulting channel number code for transfer to said bus as part of each request specifying a read operation.

7. The system of claim 6 wherein each of said like units further includes slave response circuits, said slave response circuits having comparison means connected to said storage means and to said bus respectively for receiving first signals identifying said unit and second signals identifying the unit to receive information in response to a request on said bus, said comparison means upon detecting an identical comparison between said first and second signals generating a signal which indicates when said requested information is for said unit.

8. The system of claim 7 wherein said first signals include said signals from said storage means combined with said fixed preassigned code to produce said resulting channel number code for identifying said unit.

9. The system of claim 1 wherein said bus distributed priority network includes a plurality of skewed lines for applying said plurality of skewed priority signals to said different points along said bus which allocates different priorities to said units as a function of their physical position, said points corresponding to a number of slots, a predetermined group of said number of slots being normally allocated to a corresponding number of said like units, only the like unit having the highest priority being connected to one of said points within said predetermined group of slots.

10. A data processing system including a plurality of subsystems having a number of functionally identical subsystems which are coupled to a common bus for transferring requests between said subsystems on a priority basis, said bus including a distributed priority network for defining priority on the basis of the physical position of a subsystem on said bus, a number of said requests including information identifying the subsystems which originated said requests, each of said number of identical subsystems including:

input means connected to said distributed priority network for receiving a number of priority signals identifying said physical position of said each subsystem on said bus; and, channel number storage means coupled to said input means and to said bus, said channel number storage means being conditioned by a signal from said bus to store indications representative of said number of priority signals during an idle state of said bus for uniquely identifying said functionally identical subsystem.

11. The system of claim 10 wherein said input means includes an encoder for translating said number of priority signals into a unique binary code pattern, said channel number storage means being conditioned by said signal to store indications representative of said code pattern.

12. The system of claim 10 wherein said number of identical subsystems is at least two and said channel number storage means of each functionally identical subsystem is connected to receive said number of said priority signals from said network at a different physical position on said bus.

13. The system of claim 12 wherein said channel number storage means includes at least one bistable element having a data input terminal and a clock input terminal, said data input terminal being connected to receive said number of said priority signals and said clock input terminal being connected to receive said signal from said bus indicating said idle condition, said bistable element of one of said functionally identical subsystems physically positioned on said bus to have the highest priority being switched to a first state and said bistable element of the other one of said identical subsystems being switched to a second state.

14. The system of claim 13 wherein said first and second states are defined by the binary ONE and binary ZERO states respectively of said bistable element.

15. The system of claim 13 wherein said signal indicating said idle condition operates to clear each of said subsystems to an initial state producing said idle state on said bus.

16. The system of claim 11 further including means connected to said channel storage means for combining said signals identifying said subsystem with a fixed preassigned code to produce a resulting channel number code for transfer to said bus as part of each of said number of requests specifying a read operation.

17. The system of claim 16 wherein each of said functionally identical subsystems further include slave response circuits, said slave response circuits having comparison means connected to said channel number storage means and to said bus respectively for receiving first signals uniquely identifying said subsystem and second signals identifying the subsystem to receive information in response to a request on said bus, said comparison means upon detecting an identical comparison between said first and second signals generating a signal which indicates when said requested information is for said subsystem.

18. The system of claim 17 wherein said first signals include said signals from said channel number storage means combined with said fixed preassigned code to produce said resulting channel number code for identifying said subsystem.

19. The system of claim 11 wherein said bus distributed priority network includes a plurality of skewed lines for applying said plurality of skewed priority signals to said different points along said bus which allocates different priorities to said subsystems as a function of their physical position, said points corresponding to a number of slots, a predetermined group of said number of slots being normally allocated to a corresponding number of said functionally identical subsystems, only the functionally identical subsystem having the highest priority being connected to one of said points within said predetermined group of slots.

20. The system of claim 19 wherein said functionally identical subsystems are central subsystems.

21. The system of claim 20 wherein each of said central subsystems include a plurality of central processing units.

22. A method of automatically assigning unique channel numbers to a number of functionally identical subsystems included within a plurality of subsystems which are coupled to a common bus for transferring information between said subsystems on a priority basis, said bus including a distributed priority network which provides a plurality of skewed priority signals for defining the priority of said subsystems in accessing the bus on the basis of a subsystem's physical position on said bus relative to one end of said bus, said method comprising the steps of:

connecting input means included within each functionally identical subsystem to said distributed priority network to receive a number of said plurality of skewed priority signals identifying the priority of the subsystem within the subsystem;

connecting channel storage means to said input means and to said bus;

enabling said channel storage means during an idle state of said bus to store channel number indications derived from said number of said skewed priority signals for uniquely identifying said functionally identical subsystem; and, transmitting signals representative of said stored channel number indications to said bus as a part of each request requiring identification of the requesting subsystem.

23. The method of claim 22 wherein said method further includes the steps of:

encoding said number of priority signals into a unique binary code pattern and storing said unique binary code pattern during said enabling step.

* * * * *